(12) United States Patent
Can et al.

(10) Patent No.: US 12,456,453 B2
(45) Date of Patent: *Oct. 28, 2025

(54) SYSTEMS AND METHODS FOR CORRECTING AUTOMATIC SPEECH RECOGNITION ERRORS

(71) Applicant: Capital One Services, LLC, McLean, VA (US)

(72) Inventors: Aysu Ezen Can, Cary, NC (US); Feng Qiu, Newark, DE (US); Guadalupe Bonilla, Hyattsville, MD (US); Meredith Leigh Critzer, Chesterfield, VA (US); Michael Mossoba, Great Falls, VA (US); Alexander Lin, Arlington, VA (US); Tyler Maiman, Melville, NY (US); Mia Rodriguez, Arlington, VA (US); Vahid Khanagha, Rockville, MD (US); Joshua Edwards, Philadelphia, PA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/415,572

(22) Filed: Jan. 17, 2024

(65) Prior Publication Data

US 2024/0153490 A1 May 9, 2024

Related U.S. Application Data

(63) Continuation of application No. 17/474,080, filed on Sep. 14, 2021, now Pat. No. 11,922,926.

(51) Int. Cl.
*G10L 15/01* (2013.01)
*G06F 16/35* (2019.01)
(Continued)

(52) U.S. Cl.
CPC .............. *G10L 15/01* (2013.01); *G06F 16/35* (2019.01); *G06N 5/022* (2013.01); *G10L 15/02* (2013.01);
(Continued)

(58) Field of Classification Search
None
See application file for complete search history.

(56) References Cited

U.S. PATENT DOCUMENTS 8,447,285 B1 * 5/2013 Bladon ............... H04M 7/0012
379/85
10,735,586 B1 * 8/2020 Johnston ................ G06Q 10/10
(Continued)

OTHER PUBLICATIONS

Devlin, Jacob, et al. "Bert: Pre-training of deep bidirectional transformers for language understanding." Proceedings of the 2019 conference of the North American chapter of the association for computational linguistics: human language technologies, vol. 1 (long and short papers). 2019. (Year: 2019).*
(Continued)

*Primary Examiner* — Douglas Godbold
(74) *Attorney, Agent, or Firm* — TROUTMAN PEPPER LOCKE LLP; Christopher J. Forstner; John A. Morrissett

(57) ABSTRACT

A system may include processor(s), and memory in communication with the processor(s) and storing instructions configured to cause the system to correct ASR errors. The system may receive a transcription comprising transcribed word(s) and may determine whether the transcribed word(s) exceed associated predefined confidence level(s). Responsive to determining a transcribed word does not exceed a predefined confidence level, the system may generate a predicted word. The system may calculate a distance between numerical representations of the transcribed word and the predicted word and may determine whether the distance exceeds a predefined threshold. Responsive to
(Continued)

determining the distance exceeds the predefined threshold, the system may determine whether at least one red flag word of a list of red flag words corresponds to a context of the transcription, and, responsive to making that determination, may classify the transcription as associated with a first category.

20 Claims, 7 Drawing Sheets

(51) Int. Cl.
　　　*G06N 5/022*　　　(2023.01)
　　　*G10L 15/02*　　　(2006.01)
　　　*G10L 15/10*　　　(2006.01)
　　　*G10L 15/187*　　(2013.01)
　　　*G10L 15/22*　　　(2006.01)
(52) U.S. Cl.
　　　CPC ............ *G10L 15/10* (2013.01); *G10L 15/187* (2013.01); *G10L 15/22* (2013.01); *G10L 2015/025* (2013.01)

(56) References Cited

U.S. PATENT DOCUMENTS

| | | |
|---|---|---|
| 2019/0318731 A1 | 10/2019 | Jost et al. |
| 2020/0380989 A1 | 12/2020 | Antunes et al. |
| 2021/0035566 A1 | 2/2021 | Ponniah et al. |
| 2021/0090552 A1* | 3/2021 | Tanaka ............... G10L 25/30 |
| 2022/0310077 A1* | 9/2022 | Tu ...................... G10L 15/22 |
| 2022/0392432 A1* | 12/2022 | Alphonso ........... G10L 15/22 |

OTHER PUBLICATIONS

Tanaka, T., et al., "Neural Error Corrective Language Models for Automatic Speech Recognition," INTERPSEECH. 2018 (Year: 2018).

\* cited by examiner

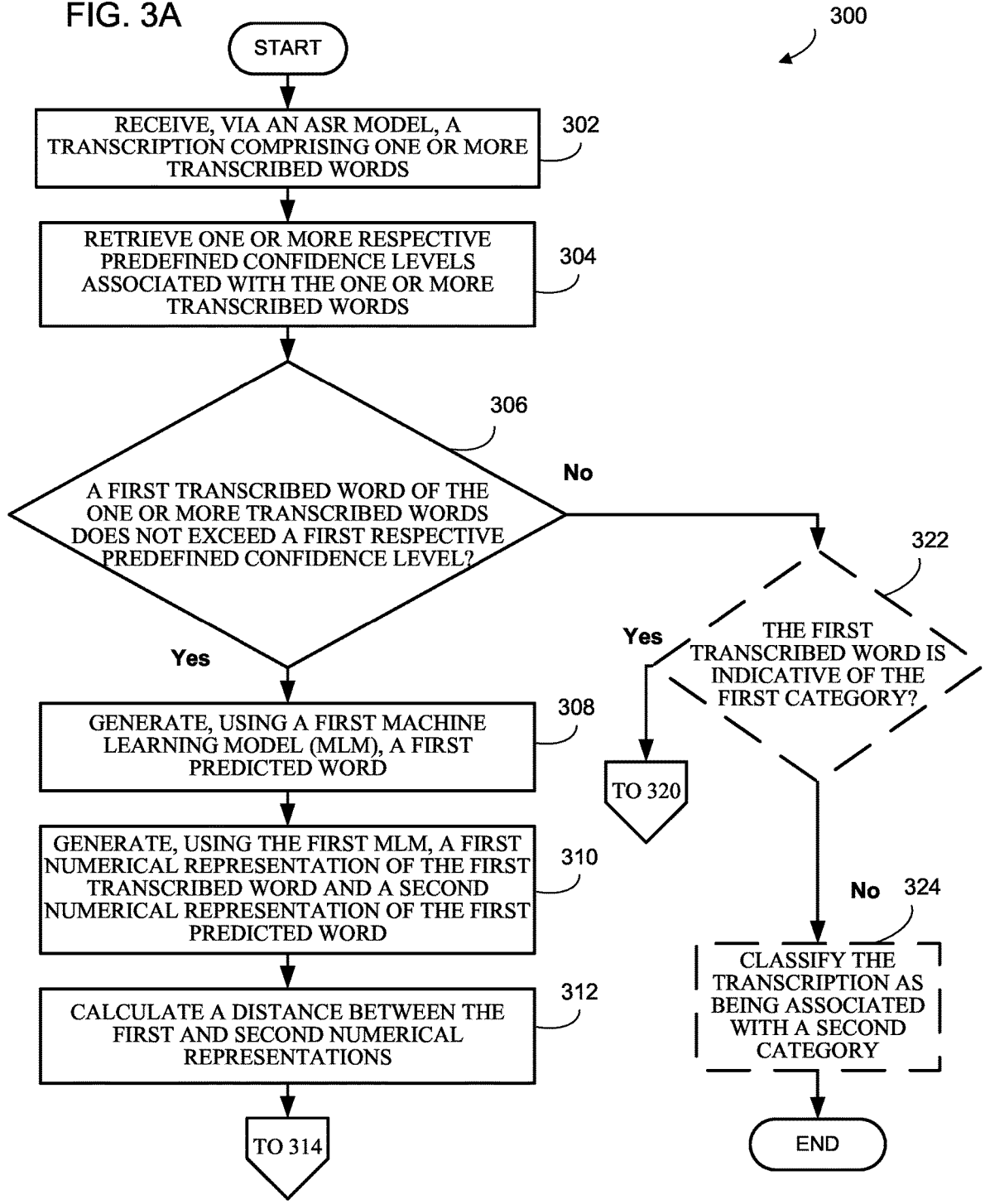

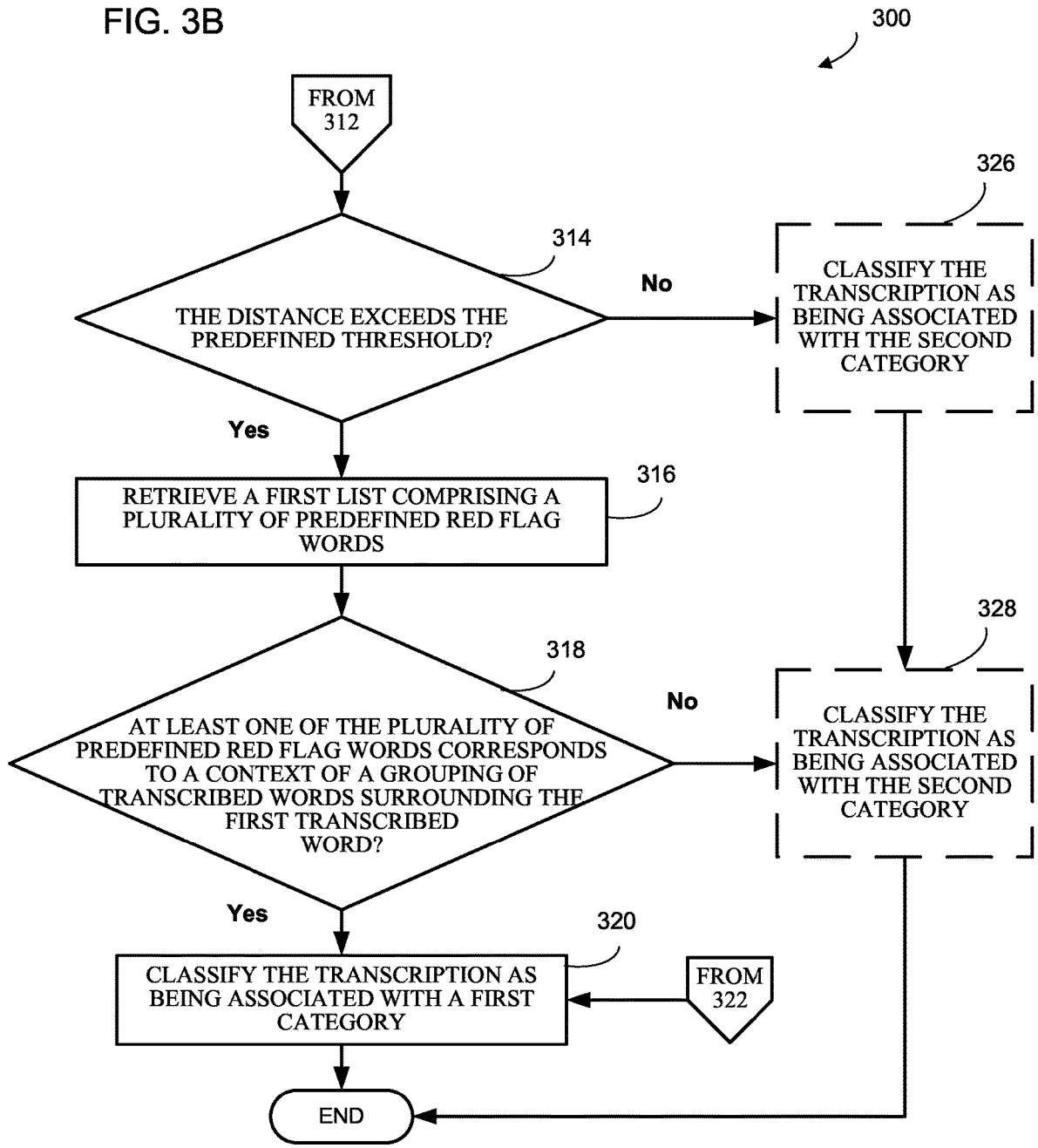

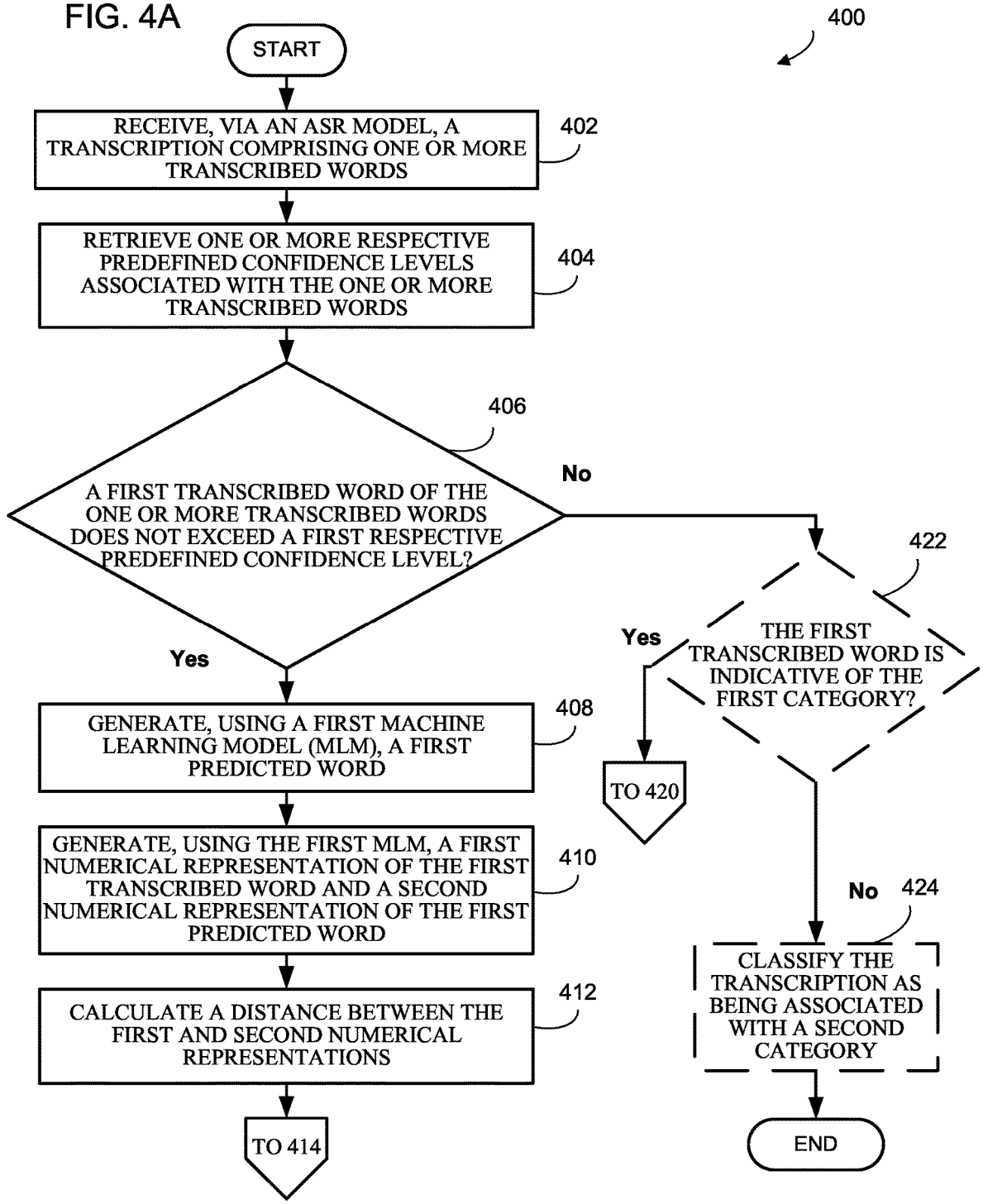

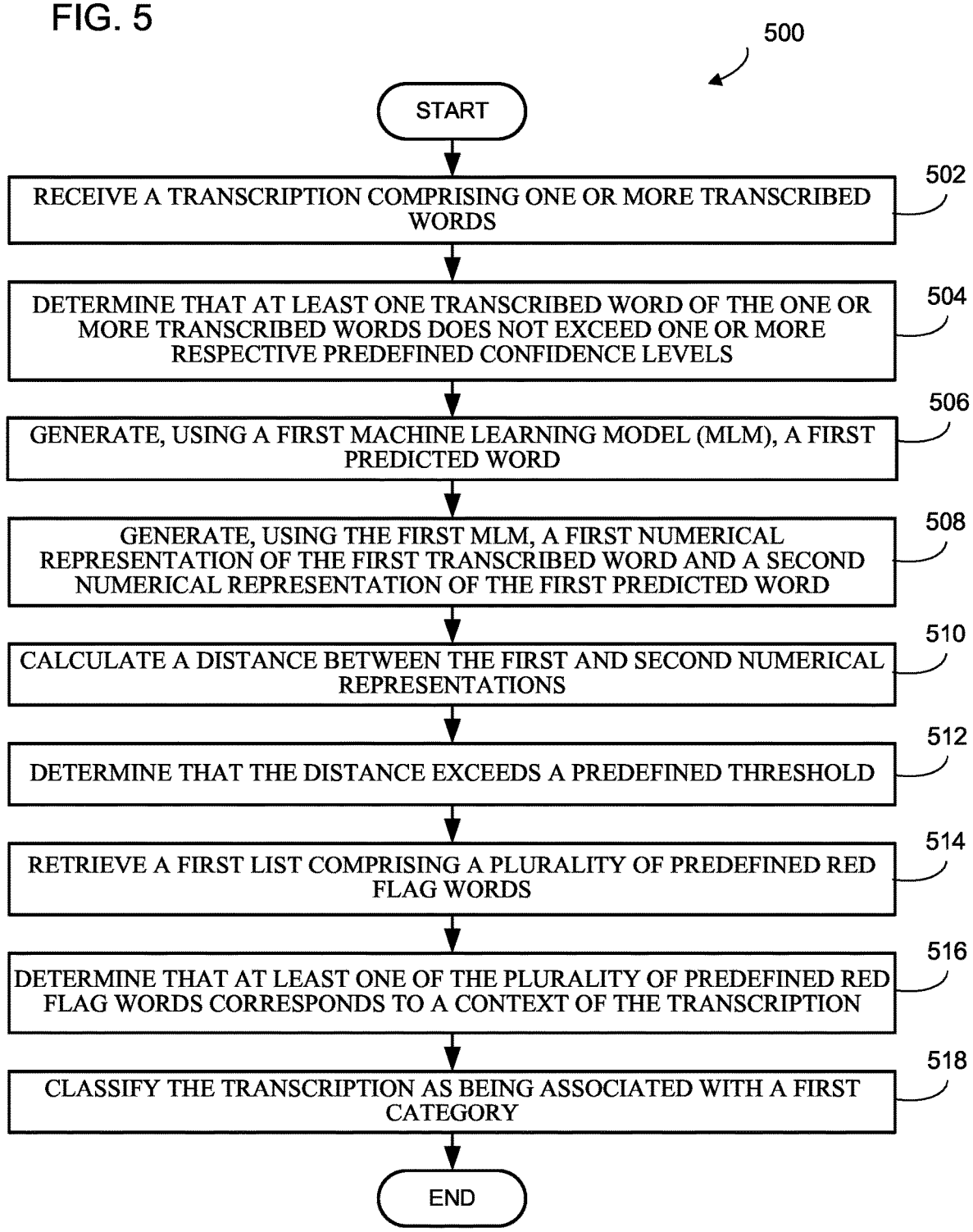

SYSTEMS AND METHODS FOR CORRECTING AUTOMATIC SPEECH RECOGNITION ERRORS

CROSS-REFERENCE TO RELATED APPLICATIONS

This application is a continuation of, and claims priority under 35 U.S.C. § 120 to, U.S. patent application Ser. No. 17/474,080, filed Sep. 14, 2021, the entire contents of which are fully incorporated herein by reference.

FIELD

The disclosed technology relates to systems and methods for correcting automatic speech recognition (ASR) errors, and in particular, for correcting ASR errors through comparing transcribed words to predefined red flag words associated with defined categories.

BACKGROUND

Automatic speech recognition is a widely used technique for converting speech to text. Many organizations rely on ASR for customer service analysis and training of machine learning models. For example, organizations utilize ASR for transcribing customers' telephone conversations with customer service agents for use in training agents how to provide more efficient services to customers. Additionally, organizations rely on ASR for identification of fraudulent activity, such as a fraudster attempting to speak with a customer service agent as if he or she was a legitimate customer. Thus, the accuracy of ASR model transcription is important for purposes of both training and any downstream modeling.

Traditional ASR systems and methods typically provide a word error rate of approximately 10-20%, leaving a significant number of words that may not be accurately transcribed. These inaccuracies can lead to organizations inefficiently training their agents and failing to flag words that may be indicative of certain categories, such as fraud.

Accordingly, there is a need for improved systems and methods for predicting and correcting ASR output errors. Embodiments of the present disclosure are directed to this and other considerations.

SUMMARY

Disclosed embodiments may include a system for correcting ASR errors. The system may include one or more processors, and memory in communication with the one or more processors and storing first instructions that are configured to cause the system to perform a method for correcting ASR errors through prediction and comparison of transcribed words. The system may receive, via an ASR model, a transcription comprising one or more transcribed words. The system may retrieve one or more respective predefined confidence levels associated with the one or more transcribed words. The system may determine whether the one or more transcribed words exceed the one or more respective predefined confidence levels. Responsive to determining that a first transcribed word of the one or more transcribed words does not exceed a first respective predefined confidence level, the system may generate, using a first machine learning model (MLM), a first predicted word (i.e., a word in place of the first transcribed word given a context of the transcription or a portion thereof). The system may generate, using the first MLM, a first numerical representation of the first transcribed word (i.e., an output of the ASR model) and a second numerical representation of the first predicted word (i.e., an output of the first MLM). The system may calculate a distance (e.g., a cosine distance) between the first and second numerical representations. The system may determine whether the distance exceeds a predefined threshold. Responsive to determining that the distance exceeds the predefined threshold, the system may retrieve a first list comprising a plurality of predefined red flag words, may determine whether at least one of the plurality of predefined red flag words corresponds to a context of a grouping of transcribed words surrounding the first transcribed word by iteratively substituting each predefined red flag word of the plurality of predefined red flag words for the first transcribed word, and, responsive to determining the at least one of the plurality of predefined red flag words corresponds to the context of the grouping of transcribed words surrounding the first transcribed word, may classify the transcription as being associated with a first category.

In another embodiment, the system may include one or more processors, and memory in communication with the one or more processors and storing first instructions that are configured to cause the system to perform a method for correcting ASR errors through prediction and comparison of transcribed words. The system may receive, via an ASR model, a transcription comprising one or more transcribed words. The system may retrieve one or more respective predefined confidence levels associated with the one or more transcribed words. The system may determine whether the one or more transcribed words exceed the one or more respective predefined confidence levels. Responsive to determining that a first transcribed word of the one or more transcribed words does not exceed a first respective predefined confidence level, the system may generate, using a first MLM, a first predicted word. The system may generate, using the first MLM, a first numerical representation of the first transcribed word and a second numerical representation of the first predicted word. The system may calculate a distance between the first and second numerical representations. The system may determine whether the distance exceeds a predefined threshold. Responsive to determining that the distance exceeds the predefined threshold, the system may retrieve a first list of words, wherein each word of the first list of words comprises a synonym to one or more predefined red flag words, may determine whether at least one word of the first list of words corresponds to a context of a grouping of transcribed words surrounding the first transcribed word by iteratively substituting each word of the first list of words for the first transcribed word, and, responsive to determining the at least one word of the first list of words corresponds to the context of the grouping of transcribed words surrounding the first transcribed word, may classify the transcription as being associated with a first category.

In another embodiment, the system may include one or more processors, and memory in communication with the one or more processors and storing first instructions that are configured to cause the system to perform a method for correcting ASR errors through prediction and comparison of transcribed words. The system may receive a transcription comprising one or more transcribed words. The system may determine that at least one transcribed word of the one or more transcribed words does not exceed one or more respective predefined confidence levels. The system may generate, using a first MLM, a first predicted word. The system may generate, using the first MLM, a first numerical representation of the at least one transcribed word and a second numerical representation of the first predicted word. The system may calculate a distance between the first and second numerical representations. The system may determine that the distance exceeds a predefined threshold. The system may retrieve a first list comprising a plurality of predefined red flag words. The system may determine that at least one of the plurality of predefined red flag words corresponds to a context of the transcription by iteratively substituting each predefined red flag word of the plurality of predefined red flag words for the at least one transcribed word. The system may classify the transcription as being associated with a first category.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 3A-3B are flow diagrams illustrating an exemplary method for correcting ASR errors, in accordance with certain embodiments of the disclosed technology.

FIGS. 4A-4B are flow diagrams illustrating an exemplary method for correcting ASR errors, in accordance with certain embodiments of the disclosed technology.

FIG. 5 is a flow diagram illustrating an exemplary method for correcting ASR errors, in accordance with certain embodiments of the disclosed technology.

DETAILED DESCRIPTION

Confidence levels of ASR output show the likelihood of the ASR transcription being correct for each word/phrase. Therefore, the higher the confidence level is for a transcribed word, the more likely that the transcription is correct (transcription is the same as the word uttered in speech). Examples of the present disclosure relate to systems and methods for correcting ASR errors. In particular, the disclosed technology relates to systems and methods for receiving an ASR module output transcription comprising transcribed words, determining whether the transcribed words exceed predefined confidence levels, generating predicted words in place of the transcribed words based on the determination of whether the transcribed words exceed the predefined confidence levels, calculating numerical differences between the transcribed and predicted words, and responsive to determining whether the numerical differences exceed predetermined thresholds, comparing the transcribed words to predefined red flag words based on the context of the original transcription. The systems and methods described herein are necessarily rooted in computer and technology as they utilize MLMs to predict which words transcribed words should be, and to make comparisons to predetermined red flag words to classify transcriptions as being associated with a certain category (e.g., fraud, user/customer frustration, etc.). Machine learning models are a unique computer technology that involves training the models to complete tasks, such as labeling, categorizing, identifying, or determining whether an ASR transcribed word exceeds a respective predefined confidence level so the MLMs learn how to label, categorize, identify, or determine whether transcribed words correspond to elements of categories (e.g., fraud, user/customer frustration, etc.). Importantly, examples of the present disclosure improve the speed with which computers can perform these automated tasks, by reducing the amount of data necessary to properly train the MLMs to make such determinations.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
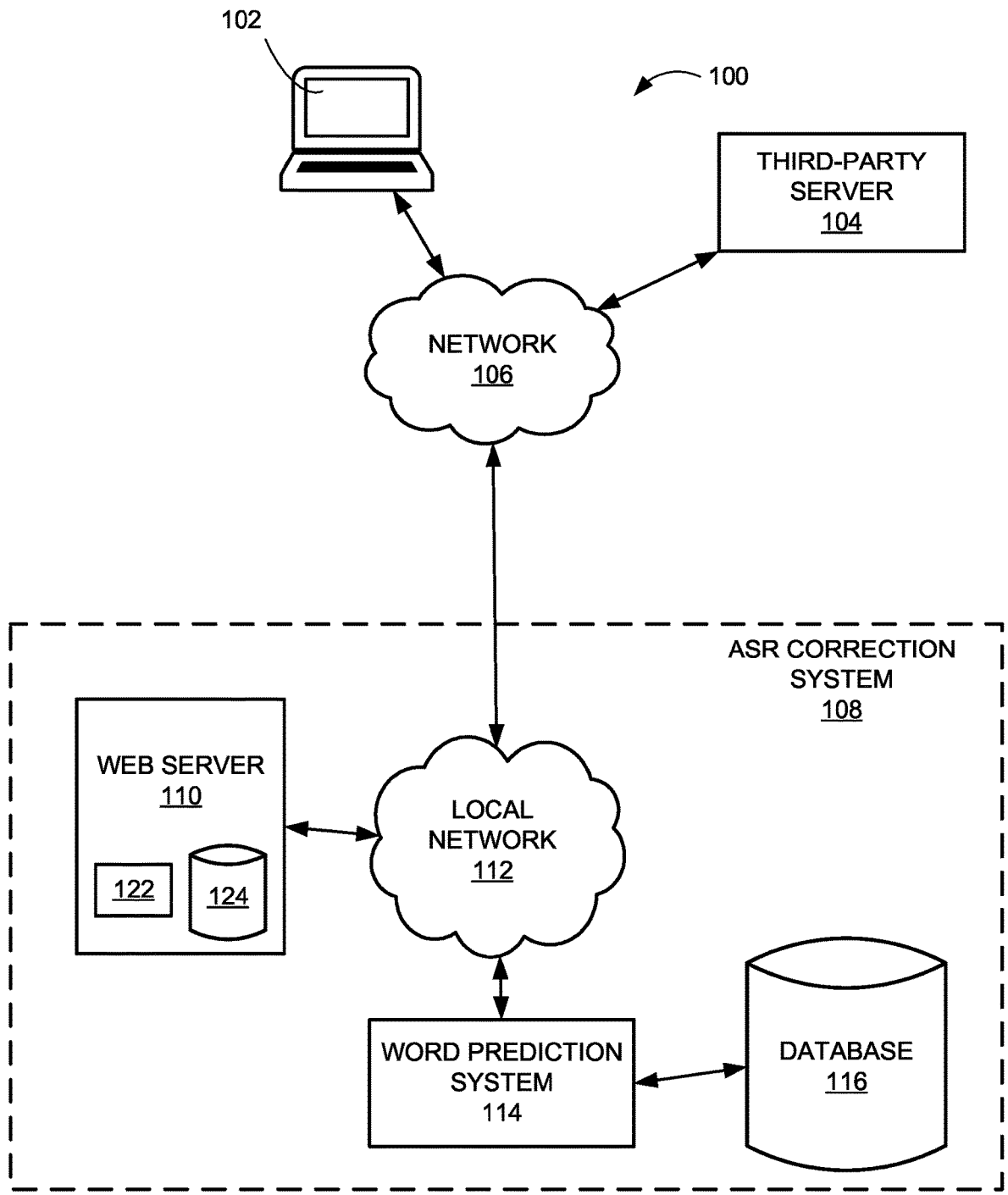
FIG. 1 is a block diagram of an example system that may be used to correct ASR errors, according to an example implementation of the disclosed technology.

FIG. 1 is a block diagram of an example system that may be used to correct ASR errors, according to an example implementation of the disclosed technology. The components and arrangements shown in FIG. 1 are not intended to limit the disclosed embodiments as the components used to implement the disclosed processes and features may vary. As shown, ASR correction system 108 may interact with a user device 102 and/or a third-party server 104 via a network 106. In certain example implementations, the ASR correction system 108 may include a local network 112, a word prediction system 114, a web server 110, and a database 116.

In some embodiments, a user may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of the ASR correction system 108. In some embodiments, the user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from or conduct a transaction in relation to an entity associated with the ASR correction system 108. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, universal serial bus (USB), wide area network (WAN), or local area network (LAN). Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may include any type of computer networking arrangement used to exchange data. For example, network 106 may be the Internet, a private data network, virtual private network using a public network, and/or other suitable connection(s) that enable(s) components in the system 100 environment to send and receive information between the components of system 100. Network 106 may also include a public switched telephone network ("PSTN") and/or a wireless network.

ASR correction system 108 may be associated with and optionally controlled by one or more entities such as a business, corporation, individual, partnership, or any other entity that provides one or more of goods, services, and consultations to individuals such as customers. In some embodiments, ASR correction system 108 may be controlled by a third party on behalf of another business, corporation, individual, or partnership. ASR correction system 108 may include one or more servers and computer systems for performing one or more functions associated with products and/or services that the organization provides.

Web server 110 may include a computer system configured to generate and provide one or more websites accessible to customers, as well as any other individuals involved in accessing system 100's normal operations. Web server 110 may include a computer system configured to receive communications from user device 102 via for example, a mobile application, a chat program, an instant messaging program, a voice-to-text program, an SMS message, email, or any other type or format of written or electronic communication. Web server 110 may have one or more processors 122 and one or more web server databases 124, which may be any suitable repository of website data. Information stored in web server 110 may be accessed (e.g., retrieved, updated, and added to) via local network 112 and/or network 106 by one or more devices or systems (e.g., word prediction system 114) of system 100. In some embodiments, web server 110 may host websites or applications that may be accessed by user device 102. For example, web server 110 may host a financial service provider website that a user device may access by providing an attempted login that is authenticated by word prediction system 114. According to some embodiments, web server 110 may include software tools, similar to those described with respect to user device 102 above, that may allow web server 110 to obtain network identification data from user device 102.

Local network 112 may include any type of computer networking arrangement used to exchange data in a localized area, such as WiFi, Bluetooth™ Ethernet, and other suitable network connections that enable components of ASR correction system 108 to interact with one another and to connect to network 106 for interacting with components in the system 100 environment. In some embodiments, local network 112 may include an interface for communicating with or linking to network 106. In other embodiments, certain components of ASR correction system 108 may communicate via network 106, without a separate local network 112.

In accordance with certain example implementations of the disclosed technology, ASR correction system 108 may include one or more computer systems configured to compile data from a plurality of sources, for example, word prediction system 114, web server 110, and/or database 116. Word prediction system 114 may correlate compiled data, analyze the compiled data, arrange the compiled data, generate derived data based on the compiled data, and store the compiled and derived data in a database such as database 116. According to some embodiments, database 116 may be a database associated with an organization and/or a related entity that stores a variety of information relating to customers, transactions, ATM, and business operations. Database 116 may also serve as a back-up storage device and may contain data and information that is also stored on, for example, database 250, as discussed below with reference to FIG. 2.

Although the preceding description describes various functions of a web server 110, a word prediction system 114, and a database 116, in some embodiments, some or all of these functions may be carried out by a single computing device or a plurality of computing devices in a (cloud) serverless system.

Figure 2:
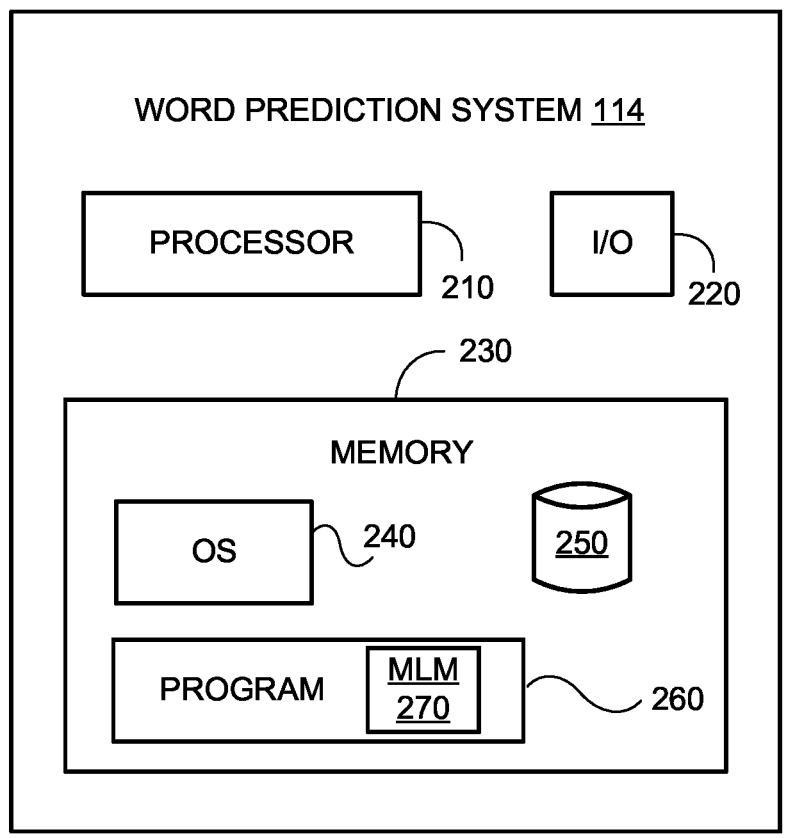
FIG. 2 is a block diagram of an example word prediction system used to predict the accuracy of words transcribed via an ASR module, according to an example implementation of the disclosed technology.

An example embodiment of word prediction system 114 is shown in more detail in FIG. 2. According to some embodiments, user device 102 and web server 110, as depicted in FIG. 1 and described above, may have a similar structure and components that are similar to those described with respect to word prediction system 114 shown in FIG. 2. As shown, word prediction system 114 may include a processor 210, an input/output ("I/O") device 220, a memory 230 containing an operating system ("OS") 240, a database 250, and a program 260. In some embodiments, program 260 may include an MLM 270 that may be trained, for example, to predict which words transcribed words should be, and to make comparisons to predetermined red flag words to identify potential fraud. In certain implementations, MLM 270 may issue commands in response to processing an event, in accordance with a model that may be continuously or intermittently updated. Moreover, processor 210 may execute one or more programs (such as via a rules-based platform or the trained MLM 270), that, when executed, perform functions related to disclosed embodiments.

In certain example implementations, word prediction system 114 may be a single server or may be configured as a distributed computer system including multiple servers or computers that interoperate to perform one or more of the processes and functionalities associated with the disclosed embodiments. In some embodiments, word prediction system 114 may be one or more servers from a serverless or scaling server system. In some embodiments, word prediction system 114 may further include a peripheral interface, a transceiver, a mobile network interface in communication with processor 210, a bus configured to facilitate communication between the various components of word prediction system 114, and a power source configured to power one or more components of word prediction system 114.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a USB port, a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, BLE, WiFi™, ZigBee™, ABC protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within memory 230.

Processor 210 may be one or more known processing devices, such as, but not limited to, a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc., multiple software processes, applications, programs, etc. One of ordinary skill in the art would understand that other types of processor arrangements could be implemented that provide for the capabilities disclosed herein.

In accordance with certain example implementations of the disclosed technology, word prediction system 114 may include one or more storage devices configured to store information used by processor 210 (or other components) to perform certain functions related to the disclosed embodiments. In one example, word prediction system 114 may include memory 230 that includes instructions to enable processor 210 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, word prediction system 114 may include a memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, word prediction system 114 may include memory 230 that may include one or more programs 260 to perform one or more functions of the disclosed embodiments. For example, in some embodiments, word prediction system 114 may additionally manage dialogue and/or other interactions with the customer via a program 260.

Processor 210 may execute one or more programs located remotely from word prediction system 114. For example, word prediction system 114 may access one or more remote programs that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include database 250 for storing related data to enable word prediction system 114 to perform one or more of the processes and functionalities associated with the disclosed embodiments.

Word prediction system 114 may also be communicatively connected to one or more memory devices (e.g., databases) locally or through a network. The remote memory devices may be configured to store information and may be accessed and/or managed by word prediction system 114. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Word prediction system 114 may also include one or more I/O devices 220 that may comprise one or more interfaces for receiving signals or input from devices and providing signals or output to one or more devices that allow data to be received and/or transmitted by word prediction system 114. For example, word prediction system 114 may include interface components, which may provide interfaces to one or more input devices, such as one or more keyboards, mouse devices, touch screens, track pads, trackballs, scroll wheels, digital cameras, microphones, sensors, and the like, that enable word prediction system 114 to receive data from a user (such as, for example, via user device 102).

In example embodiments of the disclosed technology, word prediction system 114 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While word prediction system 114 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of word prediction system 114 may include a greater or lesser number of components than those illustrated.

FIGS. 3A-3B provide a flow diagram illustrating an exemplary method 300 for correcting ASR errors, in accordance with certain embodiments of the disclosed technology. Method 300 may be performed by one or more components of system 100 (e.g., word prediction system 114 or web server 110 of ASR correction system 108 or user device 102), as described above with respect to FIGS. 1 and 2.

In block 302 of FIG. 3A, the system (e.g., via ASR correction system 108) may receive, via an ASR model, a transcription comprising one or more transcribed words. For example, the ASR model may be used for converting speech associated with a telephone call (e.g., between a customer and customer service agent) into text form.

In block 304, the system (e.g., via ASR correction system 108) may retrieve one or more respective predefined confidence levels associated with the one or more transcribed words. That is, the predefined confidence levels may be configured to indicate a likelihood that each of the one or more transcribed words was correctly transcribed by the ASR model. The system may be configured to compare each of the one or more transcribed words to its respective predefined confidence level to determine whether there is a potential error associated with one or more of the transcribed words. Higher confidence levels indicate that the ASR model is more confident about the transcribed word, and therefore the likelihood of errors for that given word is less.

In decision block 306, the system (e.g., via ASR correction system 108) may determine whether a first transcribed word of the one or more transcribed words does not exceed a first respective predefined confidence level. That is, as described above, the system may compare each of the one or more transcribed words to its respective predefined confidence level to identify whether any one of the one or more transcribed words fails to satisfy its respective confidence level, or likelihood that the word was correctly transcribed by the ASR model. The confidence levels are generated by the ASR model while transcribing each word/phrase. This is similar to a text classifier that outputs a class value with a given probability. A higher probability shows that the model is fairly confident in its prediction. The threshold for which the confidence levels will be compared to can be configured based on the application. As the threshold increases, the likelihood of incorrect transcriptions decreases, however the number of words that could not be transcribed can increase.

In block 308, in response to determining that a first transcribed word of the one or more transcribed words does not exceed a first respective predefined confidence level, the system (e.g., via word prediction system 114) may generate, using a first MLM, a first predicted word. That is, the system may rely on a trained MLM, such as a language model (e.g., Bidirectional Encoder Representations from Transformers (BERT)), to predict what word would correctly fit in place of the first transcribed word, for example, based on linguistic and/or contextual clues.

In block 310, the system (e.g., via word prediction system 114) may generate, using the first MLM, a first numerical representation of the first transcribed word and a second numerical representation of the first predicted word. The first and second numerical representations may be utilized by the first MLM to create a neutral basis upon which to identify how linguistically and/or contextually similar or different a transcribed word is compared to its respective predicted word. Numerical representations are how machine learning models process natural language. The more accurate representations there are, the better computers learn language. In some embodiments, these numerical representations may be created via word embeddings (e.g., Word2Vec, GloVe, BERT, Robustly Optimized BERT Pre-training Approach (RoBERTa), etc.). In other embodiments, these numerical representations may be created by training embeddings with in-domain data.

In block 312, the system (e.g., via word prediction system 114) may calculate a distance between the first and second numerical representations. The distance metric chosen may be one or more of cosine similarity, Euclidean distance, hamming distance, Manhattan distance, Chebyshev distance, Minkowski distance, Jaccard distance, Haversine distance, Sorensen-Dice distance, and the like. For example, the system may calculate a cosine distance, i.e., some distance between zero and one, corresponding to how similar or different a transcribed word is compared to its respective predicted word. The system may be configured to identify a predefined numerical value between zero and one above which the system may determine a transcribed word to be too linguistically and/or contextually different from its respective predicted word to have been correctly transcribed by the ASR model. The bigger the distance between a transcribed word and a predicted word, the more semantically different those words are.

Turning to FIG. 3B, in decision block 314, the system (e.g., via word prediction system 114) may determine whether the distance (e.g., cosine distance) exceeds a predefined threshold. As described above with respect to block 312, the system may be configured to identify some predefined threshold above which a transcribed word may be deemed too linguistically and/or contextually different from its respective predicted word to have been correctly transcribed by the ASR model.

In block 316, in response to determining that the distance (e.g., cosine distance) exceeds the predefined threshold, the system (e.g., via word prediction system 114) may retrieve a first list comprising a plurality of predefined red flag words. That is, if the system identifies that the first transcribed word may have been incorrectly transcribed due to the distance between the transcribed word and its respective predicted exceeding a required predefined threshold, the system may be configured to retrieve a first list of predefined red flag words in order to begin making comparisons to the transcribed words.

In some embodiments, retrieving the first list of predefined red flag words may comprise utilizing an MLM to compare a first sample of predefined calls associated with a first category (e.g., fraudulent activity) to a second sample of predefined calls associated with a second category (e.g., non-fraudulent activity). For example, the first sample of predefined calls may comprise a sample of calls between customers and customer service agents of an organization, wherein each of these calls may be associated with fraudulent activity. The second sample of predefined calls may also comprise a sample of calls between customers and customer service agents of the organization; however, each of these calls may be associated with non-fraudulent activity. Retrieving the first list of predefined red flag words may also comprise identifying one or more words frequently used in the first sample of calls, but not in the second sample of calls. For example, words associated with fraudulent activity may be identified frequently in the first set of calls, but not in the second set of calls. Retrieving the first list of predefined red flag words may also comprise labeling the one or more words as being associated with the first category. Retrieving the first list of predefined red flag words may also comprise mining and dynamically updating the list over time.

In decision block 318, the system (e.g., via word prediction system 114) may determine whether at least one of the plurality of red flag words corresponds to a context of a grouping of transcribed words surrounding the first transcribed word. That is, the system may be configured to identify context associated with the transcription or a portion of the transcription surrounding an individual transcribed word, and determine whether any of the predefined red flag words matches or aligns with the identified context.

In block 320, in response to determining at least one of the plurality of red flag words corresponds to a context of a grouping of transcribed words surrounding the first transcribed word, the system (e.g., via word prediction system 114) may classify the transcription as being associated with a first category. For example, the system may classify the transcription as being associated with fraud upon determining at least one red flag word corresponding to fraudulent activity matches or aligns with the context of the transcription or at least a portion of the transcription surrounding an individual transcribed word In another example, the system may classify the transcription as being associated with customer frustration upon determining at least one red flag word corresponding to frustration matches or aligns with a transcription context.

In some embodiments, classifying a transcription as being associated with a first category may comprise transmitting the transcription to a transcription review queue such that the transcription may be later scrutinized, for example, manually or via an MLM.

In some embodiments, the system (e.g., via ASR correction system 108), either in addition to or in lieu of comparing transcribed words to red flag words, may compare one or more respective phonemes of the transcribed words to one or more respective phonemes of the red flag words. That is, the system may identify (e.g., using an MLM) one or more respective phonemes associated with each of the plurality of predefined red flag words, and one or more respective phonemes associated with each of the one or more transcribed words. The system may then determine whether there exists any match between a red flag word phoneme and a transcribed word phoneme. In response to determining such a match, the system may classify the transcription as being associated with a first category (e.g., fraudulent activity). However, in response to determining no matches exist, the system may classify the transcription as being associated with a second category (e.g., non-fraudulent activity).

In some embodiments, the system may be configured to classify a transcription as being associated with a second category (e.g., non-fraudulent activity) in response to making other types of determinations.

In block 322 of FIG. 3A, for example, in response to determining that all of the transcribed words coming from the ASR model exceed their respective predefined confidence levels, the system (e.g., via word prediction system 114) may determine whether a first transcribed word is nonetheless still indicative of the first category (e.g., fraud, user/customer frustration, etc.) That is, even if the ASR model is confident that it correctly transcribed all of the words comprising the transcription, the system may be configured to provide a secondary review of each word. In some embodiments, this secondary review may comprise comparing each of the transcribed words to a list of red flag words or a list of phonemes of red flag words, as discussed above. In some embodiments, this secondary review may comprise comparing each of the transcribed words to a list of synonyms of red flag words, as discussed below.

In response to determining the first transcribed word is nonetheless still indicative of the first category, the system (e.g., via word prediction system 114) may classify the transcription as being associated with the first category (e.g., fraud, user/customer frustration, etc.).

However, as shown in block 324 of FIG. 3A, in response to determining the first transcribed word is not indicative of the first category, the system (e.g., via word prediction system 114) may classify the transcription as being associated with a second category (e.g., non-fraud, non-user/customer frustration, etc.).

Similarly, in block 326 of FIG. 3B, in response to determining a calculated distance (e.g., a cosine distance) does not exceed its respective predefined threshold (i.e., a transcribed word is semantically more similar to its respective predicted word), the system (e.g., via word prediction system 114) may also classify the transcription as being associated with a second category (e.g., non-fraud, non-user/customer frustration, etc.).

Similarly, in block 328 of FIG. 3B, in response to determining none of the plurality of predefined red flag words corresponds to a context of a grouping of transcribed words surrounding the first transcribed word, the system (e.g., via word prediction system 114) may also classify the transcription as being associated with a second category (e.g., non-fraud, non-user/customer frustration, etc.).

Figure 4B:
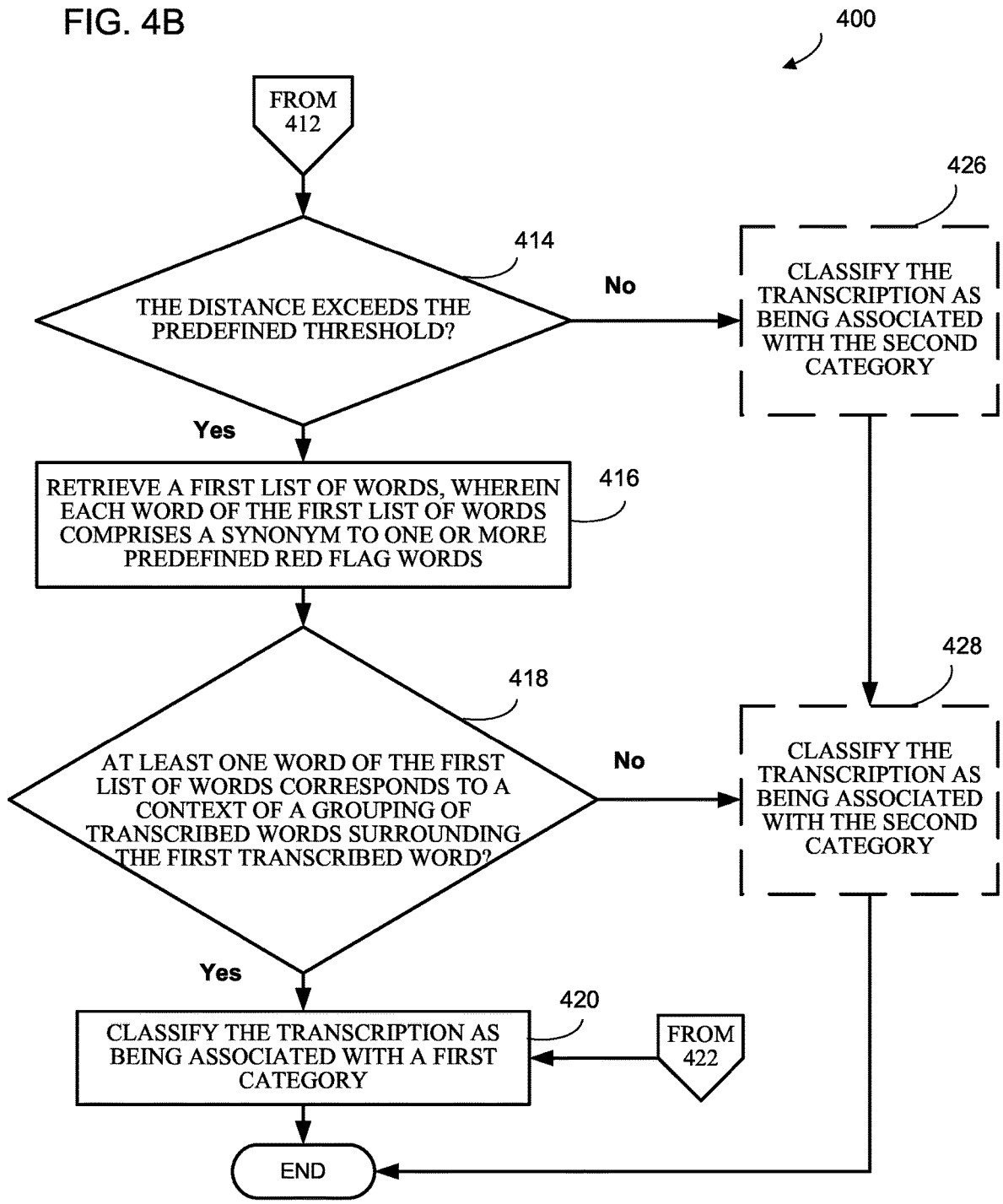

Method 400 of FIGS. 4A-4B is similar to method 300 of FIGS. 3A-3B, except that method 400 includes comparing one or more transcribed words to synonyms of predefined red flag words, while method 300 involves comparing the one or more transcribed words to the predefined red flag words themselves. The descriptions of blocks 402, 404, 406, 408, 410, 412, 414, 420, 422, 424, 426, and 428 are the same as or similar to the respective descriptions of blocks 302, 304, 306, 308, 310, 312, 314, 320, 322, 324, 326, and 328 of method 300 and as such, are not repeated herein for brevity.

In block 416 of FIG. 4B, in response to determining that the distance (e.g., cosine distance) exceeds the predefined threshold, the system (e.g., via word prediction system 114) may retrieve a first list of words, wherein each word comprises a synonym to one or more predefined red flag words. That is, if the system identifies that the first transcribed word may have been incorrectly transcribed due to the distance between the transcribed word and its respective predicted word exceeding a required predefined threshold, the system may be configured to retrieve a list of predefined red flag word synonyms in order to begin making comparisons to the transcribed words. The system may be configured to have compiled the list of predefined red flag word synonyms using a method similar to how the system compiled the list of predefined red flag words as described above with respect to block 316.

In decision block 418 of FIG. 4B, the system (e.g., via word prediction system 114) may determine whether at least one word of the first list of words corresponds to a context of a grouping of transcribed words surrounding the first transcribed word. That is, as described above with respect to block 318 of FIG. 3B, the system may be configured to identify context associated with the transcription or a portion of the transcription surrounding an individual transcribed word, and to determine whether any of the words on the first list of words (e.g., red flag word synonyms) matches or aligns with the identified context.

Method 500 of FIG. 5 is also similar to method 300 of FIGS. 3A-3B, except that method 500 does not include decision blocks as included in method 300. The descriptions of blocks 502, 504, 506, 508, 510, 512, 514, 516, and 518 are the same as or similar to the respective descriptions of blocks 302, 306, 308, 310, 312, 314, 316, 318, and 320 of method 300 and as such, are not repeated herein for brevity.

Example Use Case

The following example use case describes an example of a typical user flow pattern. This section is intended solely for explanatory purposes and not in limitation.

In one example, an organization may utilize a system for identifying and correcting errors in ASR model transcriptions to help identify fraudulent activity in calls between customers and customer service agents. The system may receive a transcription of a call, wherein the transcription comprises one or more transcribed words. The system may retrieve one or more respective predefined confidence levels associated with the one or more transcribed words such that the system can compare each transcribed word to its respective confidence level. If the system determines that all of the transcribed words exceed their respective confidence levels, and determines the transcription does not include any words associated with fraudulent activity by comparing each transcribed word to a list of predefined red flag words, the system may classify the transcription as non-fraudulent. However, if the system determines that any one transcribed word does not exceed its respective confidence level, the system may generate, using a BERT language model, a predicted word to compare to the potentially incorrectly transcribed word. The BERT model may generate the predicted word by looking at linguistic and contextual features of the transcribed word-in-question with respect to the transcription as a whole. The system may then generate, using the BERT model numerical representations of the transcribed word-in-question and the predicted word. The system may then calculate the cosine distance between those two numerical representations to determine whether the cosine distance exceeds a predefined threshold. This predefined threshold may indicate the likelihood that the transcribed word-in-question and the predicted word are close enough to each other to establish that the transcribed word-in-question was more likely than not transcribed correctly by the ASR model. If the system determines that the cosine distance does not exceed its predefined threshold (e.g., the distance is below 0.1) and none of the words in the transcription were found indicative of fraud based on the red flag list, the system may classify the transcription as non-fraudulent. However, if the system determines the cosine distance exceeds its predefined threshold (e.g., the distance exceeds 0.1), the system may retrieve the list of predefined red flag words associated with fraud in order to iteratively compare the transcribed word-in-question to each of the red flag words. The system may have previously compiled the list of red flag words by comparing sample calls between customers and customer service agents, the calls known to have been either fraudulent or non-fraudulent, to identify words more frequently used in the fraudulent calls versus the non-fraudulent calls. The system may iteratively compare the transcribed word-in-question to each of the red flag words by substituting each red flag word into the context of the transcription or a portion of the transcription surrounding the transcribed word-in-question to determine whether any of the red flag words contextually align. If the system determines that none of the red flag words contextually align with the transcription or a portion thereof, the system may classify the transcription as non-fraudulent. However, if the system determines that at least one of the red flag words does contextually align with the transcription or a portion thereof, the system may classify the transcription as fraudulent and transmit the transcription to a queue for further review.

In some examples, disclosed systems or methods may involve one or more of the following clauses:

Clause 1: A system comprising: one or more processors; and memory in communication with the one or more processors and storing instructions that are configured to cause the system to: receive, via an ASR model, a transcription comprising one or more transcribed words; retrieve one or more respective predefined confidence levels associated with the one or more transcribed words; determine whether the one or more transcribed words exceed the one or more respective predefined confidence levels; responsive to determining that a first transcribed word of the one or more transcribed words does not exceed a first respective predefined confidence level, generate, using a first machine learning model, a first predicted word; generate, using the first machine learning model, a first numerical representation of the first transcribed word and a second numerical representation of the first predicted word; calculate a distance between the first and second numerical representations; determine whether the distance exceeds a predefined threshold; and responsive to determining that the distance exceeds the predefined threshold: retrieve a first list comprising a plurality of predefined red flag words; determine whether at least one of the plurality of predefined red flag words corresponds to a context of a grouping of transcribed words surrounding the first transcribed word by iteratively substituting each predefined red flag word of the plurality of predefined red flag words for the first transcribed word; and responsive to determining the at least one of the plurality of predefined red flag words corresponds to the context of the grouping of transcribed words surrounding the first transcribed word, classify the transcription as being associated with a first category.

Clause 2: The system of clause 1, wherein retrieving the first list comprising the plurality of predefined red flag words comprises: comparing, using a second machine learning model, a first sample of predefined calls associated with the first category to a second sample of predefined calls associated with a second category; identifying one or more words frequently used in the first sample but not in the second sample; and labeling the one or more words as being associated with the first category.

Clause 3: The system of clause 1, wherein classifying the transcription as being associated with the first category comprises transmitting the transcription to a transcription review queue.

Clause 4: The system of clause 1, wherein the instructions are further configured to cause the system to: generate, using a second machine learning model, a second list of words, wherein each word of the second list of words is a synonym to at least one predefined red flag word of the plurality of predefined red flag words; determine whether at least one of the second list of words corresponds to the context of the grouping of transcribed words surrounding the first transcribed word by iteratively substituting each word of the second list of words for the first transcribed word; and responsive to determining the at least one of the second list of words corresponds to the context of the grouping of transcribed words surrounding the first transcribed word, classify the transcription as being associated with the first category.

Clause 5: The system of clause 1, wherein the instructions are further configured to cause the system to: identify, using a second machine learning model, one or more first respective phonemes associated with each of the plurality of predefined red flag words; identify, using the second machine learning model, one or more second respective phonemes associated with each of the one or more transcribed words; determine whether at least one of the one or more first respective phonemes matches at least one of the one or more second respective phonemes; and responsive to determining the at least one of the one or more first respective phonemes matches the at least one of the one or more second respective phonemes, classify the transcription as being associated with the first category.

Clause 6: The system of clause 1, wherein the instructions are further configured to cause the system to: responsive to determining that the one or more transcribed words exceed the one or more respective predefined confidence levels, determine whether a second transcribed word of the one or more transcribed words is indicative of the first category; responsive to determining the second transcribed word of the one or more transcribed words is indicative of the first category, classify the transcription as being associated with the first category; and responsive to determining the second transcribed word of the one or more transcribed words is not indicative of the first category, classify the transcription as being associated with a second category.

Clause 7: The system of clause 1, wherein the instructions are further configured to cause the system to: responsive to determining that the cosine distance does not exceed the predefined threshold, classify the transcription as being associated with a second category; and responsive to determining that none of the plurality of predefined red flag words corresponds to the context of the grouping of transcribed words surrounding the first transcribed word, classify the transcription as being associated with the second category.

Clause 8: A system comprising: one or more processors; and memory in communication with the one or more processors and storing instructions that are configured to cause the system to: receive, via an ASR model, a transcription comprising one or more transcribed words; retrieve one or more respective predefined confidence levels associated with the one or more transcribed words; determine whether the one or more transcribed words exceed the one or more respective predefined confidence levels; responsive to determining that a first transcribed word of the one or more transcribed words does not exceed a first respective predefined confidence level, generate, using a first machine learning model, a first predicted word; generate, using the first machine learning model, a first numerical representation of the first transcribed word and a second numerical representation of the first predicted word; calculate a distance between the first and second numerical representations; determine whether the distance exceeds a predefined threshold; and responsive to determining that the distance exceeds the predefined threshold: retrieve a first list of words, wherein each word of the first list of words comprises a synonym to one or more predefined red flag words; determine whether at least one word of the first list of words corresponds to a context of a grouping of transcribed words surrounding the first transcribed word by iteratively substituting each word of the first list of words for the first transcribed word; and responsive to determining the at least one word of the first list of words corresponds to the context of the grouping of transcribed words surrounding the first transcribed word, classify the transcription as being associated with a first category.

Clause 9: The system of clause 8, wherein the distance comprises one or more of cosine distance, Euclidean distance, hamming distance, Manhattan distance, Chebyshev distance, Minkowski distance, Jaccard distance, Haversine distance, Sorensen-Dice distance, or combinations thereof.

Clause 10: The system of clause 8, wherein the instructions are further configured to cause the system to: retrieve a second list comprising the one or more predefined red flag words; determine whether at least one of the one or more predefined red flag words corresponds to the context of the grouping of transcribed words surrounding the first transcribed word by iteratively substituting each predefined red flag word of the one or more predefined red flag words for the first transcribed word; and responsive to determining the at least one of the one or more predefined red flag words corresponds to the context of the grouping of transcribed words surrounding the first transcribed word, classify the transcription as being associated with the first category.

Clause 11: The system of clause 10, wherein retrieving the second list comprising the one or more predefined red flag words comprises: comparing, using a second machine learning model, a first sample of predefined calls associated with the first category to a second sample of predefined calls associated with a second category; identifying one or more words frequently used in the first sample but not in the second sample; and labeling the one or more words as being associated with the first category.

Clause 12: The system of clause 8, wherein the instructions are further configured to cause the system to: identify, using a second machine learning model, one or more first respective phonemes associated with the one or more predefined red flag words; identify, using the second machine learning model, one or more second respective phonemes associated with each of the one or more transcribed words; determine whether at least one of the one or more first respective phonemes matches at least one of the one or more second respective phonemes; and responsive to determining the at least one of the one or more first respective phonemes matches the at least one of the one or more second respective phonemes, classify the transcription as being associated with the first category.

Clause 13: The system of clause 8, wherein classifying the transcription as being associated with the first category comprises transmitting the transcription to a transcription review queue.

Clause 14: The system of clause 8, wherein the instructions are further configured to cause the system to: responsive to determining that the one or more transcribed words exceed the one or more respective predefined confidence levels, determine whether a second transcribed word of the one or more transcribed words is indicative of the first category; responsive to determining the second transcribed word of the one or more transcribed words is indicative of the first category, classify the transcription as being associated with the first category; responsive to determining the second transcribed word of the one or more transcribed words is not indicative of the first category, classify the transcription as being associated with a second category; responsive to determining that the distance does not exceed the predefined threshold, classify the transcription as being associated with the second category; and responsive to determining that none of the first list of words corresponds to the context of the grouping of transcribed words surrounding the first transcribed word, classify the transcription as being associated with the second category.

Clause 15: A system comprising: one or more processors; and memory in communication with the one or more processors and storing instructions that are configured to cause the system to: receive a transcription comprising one or more transcribed words; determine that at least one transcribed word of the one or more transcribed words does not exceed one or more respective predefined confidence levels; generate, using a first machine learning model, a first predicted word; generate, using the first machine learning model, a first numerical representation of the at least one transcribed word and a second numerical representation of the first predicted word; calculate a distance between the first and second numerical representations; determine that the distance exceeds a predefined threshold; retrieve a first list comprising a plurality of predefined red flag words; determine that at least one of the plurality of predefined red flag words corresponds to a context of the transcription by iteratively substituting each predefined red flag word of the plurality of predefined red flag words for the at least one transcribed word; and classify the transcription as being associated with a first category.

Clause 16: The system of clause 15, wherein the distance comprises one or more of cosine distance, Euclidean distance, hamming distance, Manhattan distance, Chebyshev distance, Minkowski distance, Jaccard distance, Haversine distance, Sorensen-Dice distance, or combinations thereof.

Clause 17: The system of clause 15, wherein classifying the transcription as being associated with the first category comprises transmitting the transcription to a transcription review queue.

Clause 18: The system of clause 15, wherein the instructions are further configured to cause the system to: generate, using a second machine learning model, a second list of words, wherein each word of the second list of words is a synonym to at least one predefined red flag word of the plurality of predefined red flag words; determine whether at least one of the second list of words corresponds to the context of the transcription by iteratively substituting each word of the second list of words for the at least one transcribed word; and responsive to determining the at least one of the second list of words corresponds to the context of the transcription, classify the transcription as being associated with the first category.

Clause 19: The system of clause 15, wherein retrieving the first list comprising the plurality of predefined red flag words comprises: comparing, using a second machine learning model, a first sample of predefined calls associated with the first category to a second sample of predefined calls associated with a second category; identifying one or more words frequently used in the first sample but not in the second sample; and labeling the one or more words as being associated with the first category.

Clause 20: The system of clause 15, wherein the instructions are further configured to cause the system to: identify, using a second machine learning model, one or more first respective phonemes associated with each of the plurality of predefined red flag words; identify, using the second machine learning model, one or more second respective phonemes associated with each of the one or more transcribed words; determine that at least one of the one or more first respective phonemes matches at least one of the one or more second respective phonemes; and classify the transcription as being associated with the first category.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
one or more processors; and
a memory in communication with the one or more processors and storing instructions that, when executed by the one or more processors, are configured to cause the system to:
receive, via an automatic speech recognition (ASR) model, a transcription of a conversation between a customer service agent and a customer comprising one or more transcribed words;
generate a first predicted word based on a first transcribed word of the one or more transcribed words;
generate, using a first machine learning model, a first numerical representation of the first transcribed word and a second numerical representation of the first predicted word;
calculate a distance between the first and second numerical representations;
determine whether the distance exceeds a predefined threshold; and
responsive to determining that the distance exceeds the predefined threshold:
retrieve a first list comprising a plurality of predefined red flag words;
determine whether at least one of the plurality of predefined red flag words corresponds to a context of a grouping of transcribed words surrounding the first transcribed word by iteratively substituting each predefined red flag word of the plurality of predefined red flag words for the first transcribed word;
responsive to determining the at least one of the plurality of predefined red flag words corresponds to the context of the grouping of transcribed words surrounding the first transcribed word, classify the transcription as being associated with a first category; and
automatically alert the customer service agent of the transcription being classified as being associated with the first category by transmitting the transcription to a review queue.

2. The system of claim 1, wherein retrieving the first list comprising the plurality of predefined red flag words comprises:
comparing, using a second machine learning model, a first sample of predefined calls associated with the first category to a second sample of predefined calls associated with a second category;
identifying one or more words frequently used in the first sample but not in the second sample; and
labeling the one or more words as being associated with the first category.

3. The system of claim 1, wherein the instructions are further configured to cause the system to:
generate, using a second machine learning model, a second list of words, wherein each word of the second list of words is a synonym to at least one predefined red flag word of the plurality of predefined red flag words;
determine whether at least one of the second list of words corresponds to the context of the grouping of transcribed words surrounding the first transcribed word by iteratively substituting each word of the second list of words for the first transcribed word; and
responsive to determining the at least one of the second list of words corresponds to the context of the grouping of transcribed words surrounding the first transcribed word, classify the transcription as being associated with the first category.

4. The system of claim 1, wherein the instructions are further configured to cause the system to:
identify, using a second machine learning model, one or more first respective phonemes associated with each of the plurality of predefined red flag words;
identify, using the second machine learning model, one or more second respective phonemes associated with each of the one or more transcribed words;
determine whether at least one of the one or more first respective phonemes matches at least one of the one or more second respective phonemes; and
responsive to determining the at least one of the one or more first respective phonemes matches the at least one of the one or more second respective phonemes, classify the transcription as being associated with the first category.

5. The system of claim 1, wherein the instructions are further configured to cause the system to:
responsive to determining that the one or more transcribed words exceed one or more respective predefined confidence levels, determine whether a second transcribed word of the one or more transcribed words is indicative of the first category;
responsive to determining the second transcribed word of the one or more transcribed words is indicative of the first category, classify the transcription as being associated with the first category; and
responsive to determining the second transcribed word of the one or more transcribed words is not indicative of the first category, classify the transcription as being associated with a second category.

6. The system of claim 1, wherein the instructions are further configured to cause the system to:
responsive to determining that the distance does not exceed the predefined threshold, classify the transcription as being associated with a second category; and
responsive to determining that none of the plurality of predefined red flag words corresponds to the context of the grouping of transcribed words surrounding the first transcribed word, classify the transcription as being associated with the second category.

7. The system of claim 1, wherein the first numerical representation of the first transcribed word and the second numerical representation of the first predicted word are generated by the first machine learning model via word embeddings.

8. The system of claim 7, wherein the word embeddings comprise one or more of Word2Vec, GloVe, BERT, Robustly Optimized BERT Pre-training Approach (ROBERTa), or combinations thereof.

9. The system of claim 1, wherein the distance comprises one or more of cosine distance, Euclidean distance, hamming distance, Manhattan distance, Chebyshev distance, Minkowski distance, Jaccard distance, Haversine distance, Sørensen-Dice distance, or combinations thereof.

10. A system comprising:
one or more processors; and
a memory in communication with the one or more processors and storing instructions that, when executed by the one or more processors, are configured to cause the system to:
receive, via an automatic speech recognition (ASR) model, a transcription of a conversation between a customer service agent and a customer comprising one or more transcribed words;
generate a first predicted word based on a first transcribed word of the one or more transcribed words;
generate, using a first machine learning model, a first numerical representation of the first transcribed word and a second numerical representation of the first predicted word;
calculate a distance between the first and second numerical representations;
determine whether the distance exceeds a predefined threshold;
responsive to determining that the distance exceeds the predefined threshold and to determining at least one word of a first list of words corresponds to a context of a grouping of transcribed words surrounding the first transcribed word, classify the transcription as being associated with a first category; and
automatically alert the customer service agent of the transcription being classified as being associated with the first category by transmitting the transcription to a review queue.

11. The system of claim 10, wherein the distance comprises one or more of cosine distance, Euclidean distance, hamming distance, Manhattan distance, Chebyshev distance, Minkowski distance, Jaccard distance, Haversine distance, Sørensen-Dice distance, or combinations thereof and each word of the first list of words comprises a synonym to one or more predefined red flag words.

12. The system of claim 10, wherein the instructions are further configured to cause the system to:
retrieve a second list comprising one or more predefined red flag words;
determine whether at least one of the one or more predefined red flag words corresponds to the context of the grouping of transcribed words surrounding the first transcribed word by iteratively substituting each predefined red flag word of the one or more predefined red flag words for the first transcribed word; and
responsive to determining the at least one of the one or more predefined red flag words corresponds to the context of the grouping of transcribed words surrounding the first transcribed word, classify the transcription as being associated with the first category.

13. The system of claim 12, wherein retrieving the second list comprising the one or more predefined red flag words comprises:
comparing, using a second machine learning model, a first sample of predefined calls associated with the first category to a second sample of predefined calls associated with a second category;
identifying one or more words frequently used in the first sample but not in the second sample; and
labeling the one or more words as being associated with the first category.

14. The system of claim 10, wherein the instructions are further configured to cause the system to:
identify, using a second machine learning model, one or more first respective phonemes associated with one or more predefined red flag words;
identify, using the second machine learning model, one or more second respective phonemes associated with each of the one or more transcribed words;
determine whether at least one of the one or more first respective phonemes matches at least one of the one or more second respective phonemes; and
responsive to determining the at least one of the one or more first respective phonemes matches the at least one of the one or more second respective phonemes, classify the transcription as being associated with the first category.

15. The system of claim 10, wherein the instructions are further configured to cause the system to:
responsive to determining that the one or more transcribed words exceed one or more respective predefined confidence levels, determine whether a second transcribed word of the one or more transcribed words is indicative of the first category;
responsive to determining the second transcribed word of the one or more transcribed words is indicative of the first category, classify the transcription as being associated with the first category;
responsive to determining the second transcribed word of the one or more transcribed words is not indicative of the first category, classify the transcription as being associated with a second category;
responsive to determining that the distance does not exceed the predefined threshold, classify the transcription as being associated with the second category; and
responsive to determining that none of the first list of words corresponds to the context of the grouping of transcribed words surrounding the first transcribed word, classify the transcription as being associated with the second category.

16. A system comprising:
one or more processors; and
a memory in communication with the one or more processors and storing instructions that, when executed by the one or more processors, are configured to cause the system to:
receive, via an automatic speech recognition (ASR) model, a transcription of a conversation between a customer service agent and a customer comprising one or more transcribed words;
generate a first predicted word based on at least one transcribed word of the one or more transcribed words;
generate, using a first machine learning model, a first numerical representation of the at least one transcribed word and a second numerical representation of the first predicted word;

calculate a distance between the first and second numerical representations;

determine that the distance exceeds a predefined threshold;

retrieve a first list comprising a plurality of predefined red flag words;

determine that at least one of the plurality of predefined red flag words corresponds to a context of the transcription by iteratively substituting each predefined red flag word of the plurality of predefined red flag words for the at least one transcribed word;

classify the transcription as being associated with a first category; and automatically alert the customer service agent of the transcription being classified as being associated with the first category by transmitting the transcription to a review queue.

17. The system of claim 16, wherein the instructions are further configured to cause the system to:

generate, using a second machine learning model, a second list of words, wherein each word of the second list of words is a synonym to at least one predefined red flag word of the plurality of predefined red flag words;

determine whether at least one of the second list of words corresponds to the context of the transcription by iteratively substituting each word of the second list of words for the at least one transcribed word; and responsive to determining the at least one of the second list of words corresponds to the context of the transcription, classify the transcription as being associated with the first category.

18. The system of claim 16, wherein retrieving the first list comprising the plurality of predefined red flag words comprises:

comparing, using a second machine learning model, a first sample of predefined calls associated with the first category to a second sample of predefined calls associated with a second category;

identifying one or more words frequently used in the first sample but not in the second sample; and labeling the one or more words as being associated with the first category.

19. The system of claim 16, wherein the instructions are further configured to cause the system to:

identify, using a second machine learning model, one or more first respective phonemes associated with each of the plurality of predefined red flag words;

identify, using the second machine learning model, one or more second respective phonemes associated with each of the one or more transcribed words;

determine that at least one of the one or more first respective phonemes matches at least one of the one or more second respective phonemes; and classify the transcription as being associated with the first category.

20. The system of claim 16, wherein the distance comprises one or more of cosine distance, Euclidean distance, hamming distance, Manhattan distance, Chebyshev distance, Minkowski distance, Jaccard distance, Haversine distance, Sørensen-Dice distance, or combinations thereof.

* * * * *